US007289878B1

(12) United States Patent
Estelle et al.

(10) Patent No.: US 7,289,878 B1
(45) Date of Patent: Oct. 30, 2007

(54) APPARATUS AND METHOD FOR MODIFYING OPERATION OF AN ELECTRIC GUN DRIVER

(75) Inventors: Peter Estelle, Norcross, GA (US); Laurence B. Saidman, Duluth, GA (US); Scott Means, Lawrenceville, GA (US); David Zgonc, Atlanta, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 09/571,677

(22) Filed: May 15, 2000

(51) Int. Cl.
*G06F 17/00* (2006.01)

(52) U.S. Cl. ...................... 700/233; 700/240; 700/283; 222/1; 222/504; 222/518; 222/333; 239/585.1

(58) Field of Classification Search ................ 700/233, 700/241; 222/1, 146, 5
See application file for complete search history.

(56) References Cited

U.S. PATENT DOCUMENTS

| | | | | | |
|---|---|---|---|---|---|
| 3,792,801 | A | * | 2/1974 | Baker et al. | 134/19 |
| 4,107,777 | A | * | 8/1978 | Pearson et al. | 222/26 |
| 4,433,795 | A | * | 2/1984 | Maiefski et al. | 222/14 |
| 4,453,652 | A | * | 6/1984 | Merkel et al. | 222/504 |
| 4,500,937 | A | * | 2/1985 | Matt | 361/153 |
| 4,584,964 | A | * | 4/1986 | Engel | 118/610 |
| 4,718,454 | A | * | 1/1988 | Appleby | 137/624.11 |
| 4,779,762 | A | * | 10/1988 | Klein et al. | 137/4 |
| 4,848,725 | A | * | 7/1989 | Tibbals, Jr. | 251/129.02 |
| 4,890,188 | A | * | 12/1989 | Russell et al. | 307/82 |
| 4,904,919 | A | * | 2/1990 | McNaughton | 318/798 |
| 5,361,216 | A | * | 11/1994 | Warn et al. | 700/236 |
| 5,375,738 | A | | 12/1994 | Walsh et al. | 222/1 |
| 5,535,919 | A | * | 7/1996 | Ganzer et al. | 222/1 |
| 5,580,366 | A | | 12/1996 | Farkas et al. | 65/158 |
| 5,598,973 | A | * | 2/1997 | Weston | 239/583 |
| 5,624,473 | A | | 4/1997 | Farkas et al. | 65/158 |
| 5,666,286 | A | * | 9/1997 | Nojima et al. | 324/600 |
| 5,698,031 | A | * | 12/1997 | Winkle | 118/264 |
| 5,720,922 | A | | 2/1998 | Ghaed et al. | 422/52 |
| 5,782,410 | A | * | 7/1998 | Weston | 239/583 |
| 5,791,531 | A | * | 8/1998 | Hassler, Jr. | 222/504 |
| 5,812,355 | A | * | 9/1998 | Nojima | 361/152 |

(Continued)

FOREIGN PATENT DOCUMENTS

EP 0403280 12/1990

OTHER PUBLICATIONS

The Electrical Engineering Handbook, 2nd Ed., by Dorf, Richard C., published in 1997 by CRC Press, pp. 1874-1898.*

(Continued)

*Primary Examiner*—Patrick Mackey
*Assistant Examiner*—Jeffrey A Shapiro
(74) *Attorney, Agent, or Firm*—Wood, Herron & Evans, LLP

(57) ABSTRACT

A method and apparatus for providing adjustment of current-related dispensing parameters in an electric dispensing gun. A control circuit receives user-selected inputs corresponding to dispensing parameters of the gun and converts those inputs into digital signals. The digital signals are applied to a digitally programmable driver circuit associated with the liquid dispensing gun to control at least some of the dispensing parameters of the gun. Diagnostic information pertinent to the operation of the dispensing gun is provided to the operator for evaluation and adjustment.

19 Claims, 4 Drawing Sheets

U.S. PATENT DOCUMENTS

| | | | | | |
|---|---|---|---|---|---|
| 5,875,922 | A | * | 3/1999 | Chastine et al. | 222/1 |
| 5,907,339 | A | * | 5/1999 | Evans et al. | 347/20 |
| 5,915,591 | A | * | 6/1999 | Erickson et al. | 222/1 |
| 5,925,021 | A | * | 7/1999 | Castellano et al. | 600/309 |
| 5,934,521 | A | * | 8/1999 | Yamada et al. | 222/146.2 |
| 5,995,909 | A | | 11/1999 | Bretmersky et al. | 702/50 |
| 6,010,740 | A | * | 1/2000 | Rutledge et al. | 427/8 |
| 6,036,055 | A | * | 3/2000 | Mogadam et al. | 222/1 |
| 6,056,165 | A | * | 5/2000 | Speranza | 222/326 |
| 6,061,225 | A | * | 5/2000 | Nojima | 361/154 |
| 6,067,480 | A | * | 5/2000 | Stuffle et al. | 700/109 |
| 6,152,386 | A | * | 11/2000 | Bullock et al. | 239/135 |
| 6,263,319 | B1 | * | 7/2001 | Leatherman | 700/236 |
| 6,318,599 | B2 | * | 11/2001 | Estelle et al. | 222/146.5 |
| 6,409,145 | B1 | * | 6/2002 | Fong et al. | 251/129.18 |
| 6,520,382 | B2 | | 2/2003 | Estelle et al. | |
| 6,685,777 | B2 | | 2/2004 | Sato et al. | 118/669 |
| 6,688,715 | B2 | | 2/2004 | Estelle | |
| 6,978,978 | B2 | | 12/2005 | Near | |

OTHER PUBLICATIONS

European Patent Office, *European Search Report*, Jan. 13, 2005 (4 pages).

* cited by examiner

APPARATUS AND METHOD FOR MODIFYING OPERATION OF AN ELECTRIC GUN DRIVER

FIELD OF THE INVENTION

The present invention relates generally to apparatus for dispensing viscous fluids and, more particularly, to an electric liquid dispensing gun and method for dispensing viscous liquids, such as hot melt adhesives.

BACKGROUND OF THE INVENTION

The ability to rapidly, precisely and safely dispense viscous industrial materials, such as hot melt adhesives, is a modern-day necessity for many manufacturers. Accordingly, substantial resources have been invested for the purpose of improving the accuracy and performance of the processes responsible for the application of adhesives, caulks and sealants, for example. Resultant innovations such as electrically activated dispensing guns have greatly enhanced the ability of manufacturers to control fluid placement and flow rates, and have allowed for the accomplishment of more complex and sophisticated liquid dispensing patterns to be applied to a substrate. The challenges associated with meeting expanding industry requirements necessitate still greater improvements in the operational performance of electric gun dispensers.

Electric liquid dispensing guns generally include an electromagnetic coil surrounding an armature that is energized to produce an electromagnetic field with respect to a magnetic pole. The electromagnetic field is selectively controlled to open and close a dispensing valve by moving a valve stem connected to the armature. More specifically, the forces of magnetic attraction between the armature and the magnetic pole move the armature toward the pole, thereby opening the dispensing valve. At the end of a dispensing cycle, the electromagnetic coil is de-energized, and a return spring returns the armature and valve stem to their original positions, thereby closing the dispensing valve.

Driver circuits have been employed to regulate and control the current delivered to the electromagnetic coil. Thus, liquid is dispensed from the valve according to the magnitude of current supplied by the driver circuit. Supplied current levels correspond to the amount of current required to move the armature into an open position at the beginning of a dispensing cycle, as well as to the amount required to hold it in a position that allows continuous fluid application. Finally, an absence of current from the gun driver circuit effects a demagnetization of the coil and causes the dispensing valve to close.

The optimal operation of a liquid dispensing gun depends upon effective management of a number of factors, such as the electrical capabilities of the dispensing gun and the operating conditions for a particular liquid dispensing application. Several variables that must be taken into account include the viscosity and temperature of the liquid being dispensed, the configuration and number of dispensing guns, the pattern to be dispensed onto the substrate, the traveling speed of the substrate relative to the dispensing gun, and the frequency of the liquid dispensing cycles.

Proper accounting and management of the above operating conditions for a particular liquid dispensing application currently requires an operator to possess a sophisticated understanding of the electrical capabilities of the electric dispensing gun, and often necessitates cumbersome, expensive testing equipment to ensure that the proper dispensing parameters have been set. The requisite operator expertise is in part attributable to the absence of a generally understood and accessible interface to the electric dispensing gun that permits operating parameters of the gun to be set. For instance, settings on typical electric dispensing guns may be defined in terms of electrical quantities that relate to current values to be applied to the gun, such as peak current levels, duration of peak current and hold current level. Such terminology may not intuitively correlate with the operating conditions facing an operator, such as fluid viscosity, liquid dispensing pattern to be applied, line speed and equipment operating temperatures. Thus, an operator must convert and associate the operating conditions pertinent to a particular dispensing application with the optimum electrical settings of the gun controls. This conversion procedure may be prone to translational and mathematical errors, and may also result in the less than optimal utilization of liquid dispensing equipment.

The procedure for setting dispensing parameters is further complicated where a user must manually adjust the circuitry and settings of an electric dispensing gun. Controls responsible for setting dispensing parameters are commonly not designed for field modification and may be generally inaccessible. For instance, an operator may be required to mechanically adjust current settings by constantly manipulating a series of small dip switches or buttons, or by depressing arrows on a converted keypad. Consequently, manual adjustments are prone to error, and inconvenient placement of settings controls on the dispensing equipment may require operation of a gun to be halted in order for the controls to be accessed. Thus, the present manual adjustment of dispensing parameters of electric liquid dispensing guns has several known drawbacks.

Therefore, there is a need for an improved manner of guiding an operator toward a proper setup of an electric liquid dispensing gun and enabling convenient adjustment once the proper set-up has been determined.

SUMMARY OF THE INVENTION

The present invention overcomes the foregoing and other shortcomings and drawbacks of electric liquid dispensing guns heretofore known. While the invention will be described in connection with certain embodiments it will be understood that the invention is not limited to these embodiments. On the contrary, the invention includes all alternatives, modifications and equivalents as may be included within the spirit and scope of the present invention.

The present invention addresses these and other problems associated with liquid dispensing systems of the prior art by providing a novel apparatus and method for setting and controlling the optimal dispensing parameters of one or more electric dispensing guns in a liquid dispensing system. The liquid dispensing system includes a control circuit that is capable of receiving user-selected data relating to conditions of the particular liquid dispensing application and converting the user-selected data to dispensing parameters for controlling operation of the dispensing gun.

The control circuit includes a software algorithm or look-up table that encapsulates knowledge of advantageous or optimum values of dispensing parameters for particular dispensing application conditions. The control circuit converts the user-selected data into the advantageous or optimum dispensing parameters and applies the parameters as digital signals to a digitally programmable driver circuit coupled to the liquid dispensing gun to control at least some of the liquid dispensing parameters of the gun. An interface circuit may be coupled between the control circuit and the programmable driver circuit that is capable of applying the digital signals from the control circuit in a signal format that is compatible with the programmable driver circuit. The programmable driver circuit is configured by the digital signals to generate a current waveform that is used to actuate operation of the dispensing gun 12.

According to one aspect of the present invention, an operator is prompted to enter user-selected data into the control circuit that corresponds to operating conditions of the particular dispensing application, including variable or values corresponding to the number of liquid dispensing guns used in the particular dispensing application, the definition of the liquid pattern to be dispensed, the line speed of the substrate, the viscosity of the liquid and the operating temperature of the liquid dispensing system. A software algorithm or look-up table is executed by the control circuit to convert the user-selected data into the digital signals that are applied to the programmable driver circuit.

In one embodiment of the present invention, the programmable driver circuit includes one or more digitally controlled potentiometers capable of varying the waveform as applied to the electromagnetic coil of the liquid dispensing gun. The programmable driver circuit has non-volatile memory for storing the setting of the potentiometers for subsequent dispensing applications. In accordance with the principles of the present invention, the control circuit may be detached and removed from the liquid dispensing gun after the dispensing parameters have been set in the programmable driver circuit.

In accordance of another aspect of the present invention, the liquid dispensing system includes a single programmable driver circuit that is coupled to multiple liquid dispensing guns. The coils of the liquid dispensing guns are coupled in series across the output of the programmable driver circuit. In this way, the single programmable driver circuit is capable of controlling the dispensing parameter of multiple guns without significant reduction in gun performance.

In accordance with yet another aspect of the present invention, an operator inputs user-selected data by adjusting one or more selector devices coupled to the control circuit, such as rotary switches or buttons on a keypad. For example, the viscosity of the fluid to be dispensed may be input by adjusting one selector device, and the type and model of the dispensing gun employed in the dispensing application may be input by the second selector device. The control circuit executes a look-up table to associate the user-selected data with optimal dispensing parameters of the gun for the particular dispensing application.

Thus, the present invention allows the operator to communicate in the familiar application terms of the operating conditions rather than in the electrical quantities required by the driver circuit. The speed, accuracy and consistency of the resultant dispensing parameters serve to reduce instances of operator error, while saving time currently required to perform conversions. Additionally, an operator is enabled to simultaneously reprogram multiple parameters, while executing reprogramming processes in accordance with evolving operating conditions.

One particular application deriving unique benefit from the invention involves electronic liquid dispensing guns. However, it should be appreciated that the invention may benefit other devices that dispense liquids in a manner consistent with the invention. Also, while one embodiment of the invention involves a programmable driver circuit connected to a laptop computer and interface circuit, the system may alternatively incorporate a smaller, hand-held device that functions as both the controller and as the interface circuit.

The above and other objects and advantages of the present invention shall be made apparent from the accompanying drawings and the description thereof.

DETAILED DESCRIPTION OF THE PREFERRED EMBODIMENT

Figure 1:
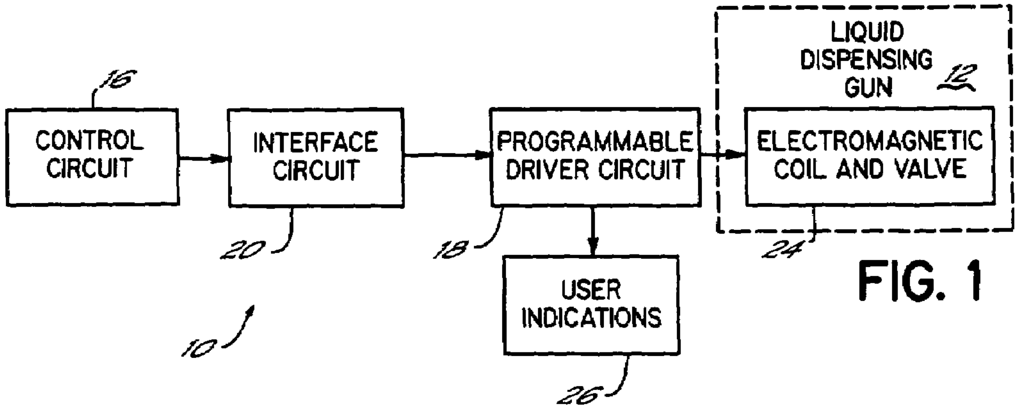
FIG. 1 is a functional block diagram illustrating a liquid dispensing gun system in accordance with the principles of the present invention.

Referring to the figures, and to FIG. 1 in particular, a liquid dispensing system 10 is shown in accordance with the principles of the present invention. Liquid dispensing system 10 includes one or more electrically operated liquid dispensing guns 12 that are capable of dispensing viscous liquid material onto a substrate 14 (FIG. 2) according to a predetermined liquid dispensing pattern. As will be described in greater detail below, liquid dispensing system 10 utilizes a control circuit 16 that is capable of receiving user-selected data relating to conditions of the particular liquid dispensing application. The user-selected data includes variables or values corresponding to the number of liquid dispensing guns used in the particular dispensing application, the definition of the liquid pattern to be dispensed, the line speed of the substrate, the viscosity of the liquid and the operating temperature of the liquid dispensing system. The control circuit 16 includes a software algorithm or look-up table that encapsulates knowledge of advantageous or optimum values of dispensing parameters for particular dispensing application conditions. The control circuit 16 converts the user-selected data into the advantageous or optimum dispensing parameters and applies the parameters as digital signals to a digitally programmable driver circuit 18 coupled to the liquid dispensing gun 12 to control least some of the dispensing parameters of the gun 12. The programmable driver circuit 18 is configured by the digital signals to generate a current waveform that is used to actuate operation of the dispensing gun 12. An interface circuit 20 may be coupled between the control circuit 16 and the programmable driver circuit 18 that is capable of applying the digital signals from the control circuit 16 in a signal format that is compatible with the programmable driver circuit 18.

The control circuit 16 may comprise a laptop computer, controller, ASIC, micro-controller, programmable logic device (PLD), application specific integrated circuit (ASIC) or equivalent device that is capable of receiving the user-selected data and converting the data into the dispensing parameters that are applied to the programmable driver circuit 18. For example, the control circuit 16 may comprise a laptop computer that applies the digital signals to the interface circuit 20 that is attached to a parallel port of the control circuit 16. The digital signals are formatted by the interface circuit 20 to be compatible with the programmable driver circuit 18. Alternatively, the control circuit 16 and interface circuit 20 may be combined as a single unit without departing from the spirit and scope of the present invention.

According to one aspect of the present invention, an operator is prompted to enter user-selected data into the control circuit 16 that corresponds to operating conditions of the dispensing application, including the following: (i) the liquid viscosity, which may be entered in units of millipascals or centipoise, (ii) the operating temperature of the liquid dispensing system 10, (iii) the dispensing pattern, i.e., fluid droplets, a continuous bead or area coverage and pattern definition data, including dot diameter, bead diameter, pattern width per module, add-on rate, single or multiple-pattern and dispensing time or length, (iv) the speed of the substrate, which may be measured in feet or meters per second, and (v) the number and model of dispensing guns used. The above user-selected data is entered into the control circuit 16 by either being typed in by the operator or selected from a graphical user interface such as a pull-down menu or slider bars, and may be adjusted at any time during a dispensing application. A software algorithm or look-up table executed by the control circuit 16 converts the user-selected data into digital signals that correspond to the optimal dispensing parameters for the particular liquid dispensing application conditions.

According to one aspect of the present invention, the programmable driver circuit 18 includes one or more digitally controlled potentiometers 22 (FIG. 5) that are operable to vary the waveform that is applied to an electromagnetic coil 24 of the liquid dispensing gun 12. Thus, the dispensing parameters determined by the control circuit 16 are set in the programmable driver circuit 18 to control dispensing of liquid in a controlled manner by the liquid dispensing gun 12. The programmable driver circuit 18 has non-volatile memory for storing the setting of the potentiometers 22 for subsequent dispensing applications. In this way, the control circuit 16 may be detached and removed from the liquid dispensing gun 12 after the dispensing parameters have been set in the programmable driver circuit 18. Alternatively, the programmable driver circuit 18 may include one or more digital-to-analog converters or equivalent devices (not shown) that are capable of receiving digital control signals from control circuit 16 to set-up and provide dispensing parameters of the gun 12 and provide an analog output to control the current waveform applied to the coil 24 of the gun 12. Operational and thermal diagnostic information pertinent to the operation of liquid dispensing gun 12, such as the status of the current supplied to the gun 12, is transmitted back to the programmable driver circuit 18 and displayed to the operator through user indications 26, such as a series of light emitting diodes (FIG. 5), associated with the programmable driver circuit 18 for real-time evaluation by the operator.

Figure 2:
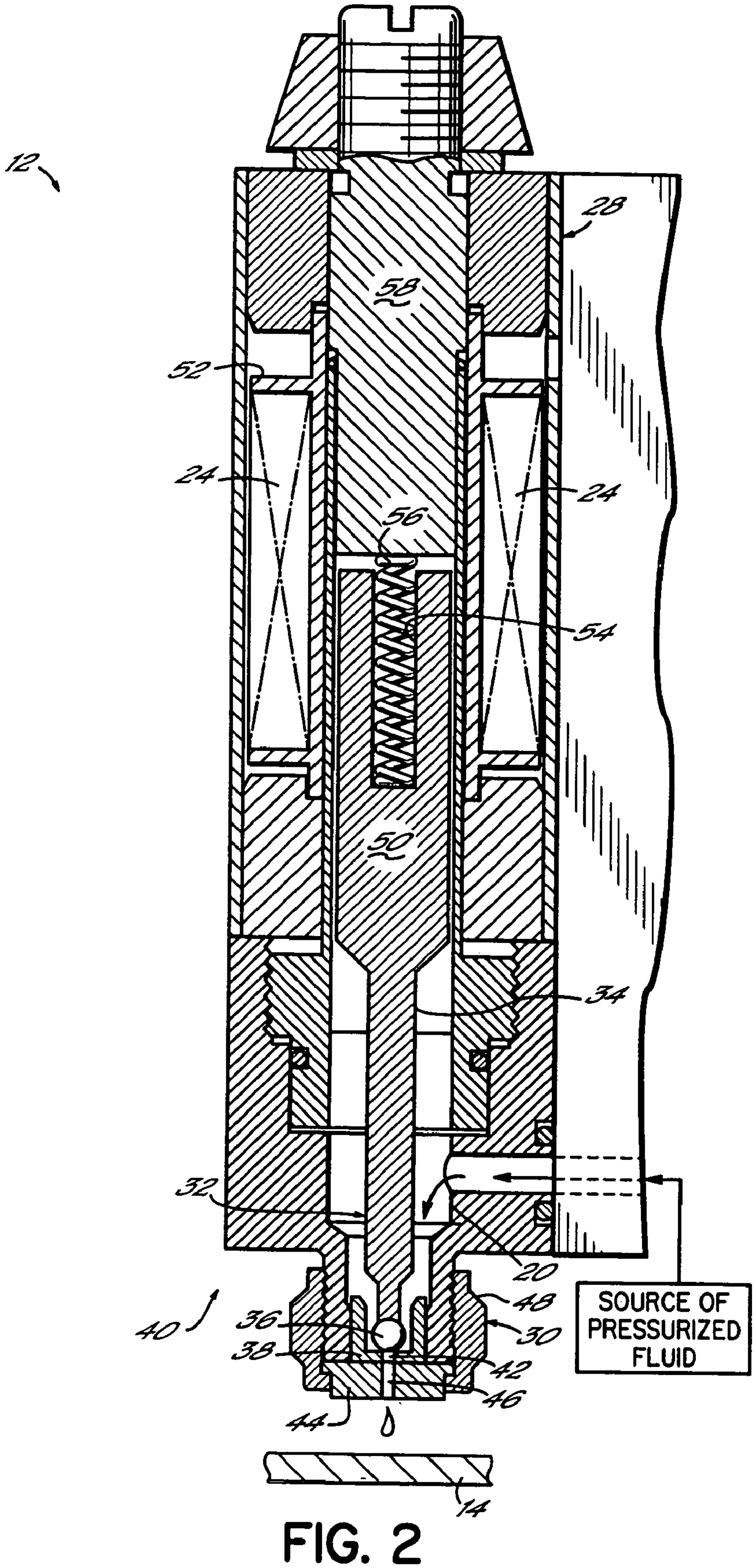
FIG. 2 is an axial cross-sectional view of an exemplary electric liquid dispensing gun for use with a programmable driver circuit in accordance with the principles of the invention.

One example of an electric liquid dispensing gun 12 that may be utilized in liquid dispensing system 10 is depicted in FIG. 2. Liquid dispensing gun 12 is adapted for dispensing high viscosity fluids, such as a hot melt adhesive, but other dispensed fluids can benefit from the invention as well, such as soldering fluxes, thermal greases, heat transfer compounds and solder pastes. Dispensing gun 12 is mounted as a component of a dispensing machine or system (not shown) in a known manner to dispense fluids in controlled amounts, such as droplets, dots, or continuous beads onto the moving substrate 14. An exemplary liquid dispensing gun 12 for use in the present invention is described in commonly-assigned U.S. Pat. No. 5,875,922, entitled APPARATUS FOR DISPENSING AN ADHESIVE, issued on Mar. 2, 1999, which is hereby incorporated by reference herein in its entirety.

Briefly, liquid dispensing gun 12 includes a dispenser body 28 and a fluid dispensing nozzle body 30. A valve stem 32, including shaft 34, is mounted in an interior portion of the dispenser body 28. A ball 36 is mounted to a lower end of the shaft 34 which is shown in FIG. 2 in sealing engagement with a valve seat 38 positioned in the nozzle body 30. Thus, the valve stem 32 and ball 36 reciprocate between opened and closed positions with respect to the valve seat 38, thereby operating as a dispensing valve 40. With the ball 36 sealingly engaging valve seat 38, high viscosity fluid, such as a hot melt adhesive, cannot flow through an outlet 42 in the valve seat 38. The nozzle body 30 also has a nozzle tip 44 with a dispensing orifice 46 aligned with the outlet 42 and flush mounted to the valve seat 38 by a threaded retaining nut 48. The nozzle tip 44 can be readily exchanged with a different nozzle tip to produce droplets or beads of different sizes and, in some cases, a different shape.

An armature 50 is disposed within the interior portion of dispenser body 28 and is coaxially aligned with and, preferably, formed integrally with shaft 34. Electromagnetic coil 24 is disposed about the armature 50. Although any suitable electromagnetic coil could be used, it is contemplated that the electromagnetic coil 24 will be generally toroidal in shape. The coil 24 is contained in a housing 52 and connected to a power source (not shown). When supplied with electrical current, the coil 24 generates an electromagnetic field which actuates the valve stem 32 to an open position as is known in the art.

Figure 5:
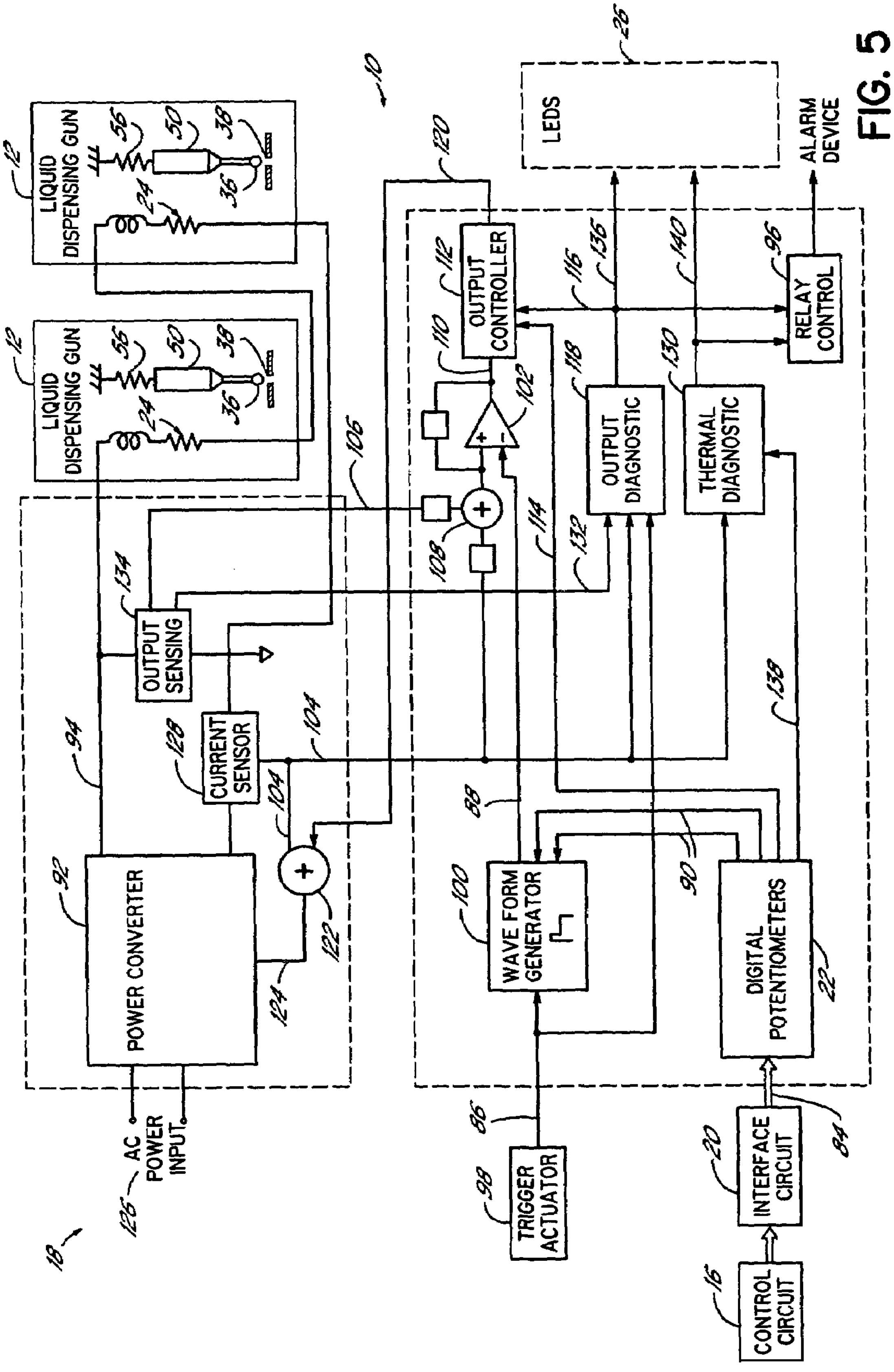
FIG. 5 is a schematic block diagram of a digitally programmable driver circuit and electric liquid dispensing gun in accordance with the principles of the present invention.

In accordance with one aspect of the present invention, the liquid dispensing system 10 includes a single programmable driver circuit 18 that is coupled to multiple liquid dispensing guns 12 (two shown in FIG. 5). The coils 24 of the liquid dispensing guns 12 are coupled in series across the output of driver circuit 18 as shown in FIG. 5. In this way, the single programmable driver circuit 18 is capable of controlling the dispensing parameters of multiple guns 12 without significant reduction in gun performance.

For each dispensing gun 12, a bore 54 extends into the armature 50 to house a return spring 56. The return spring 56 biases the valve stem 37 and, more specifically, the ball 36, to sealingly engage the valve seat 38 in a closed position. The return spring 56 is normally a compression spring which is placed under compression within the bore 54 through engagement with an electromagnetic pole 58. To achieve an opened position, the electromagnetic coil 26 must generate a sufficient electromagnetic field between the armature 50 and the pole 58 so as to attract the armature 50 and the pole 58 together.

Figure 3:
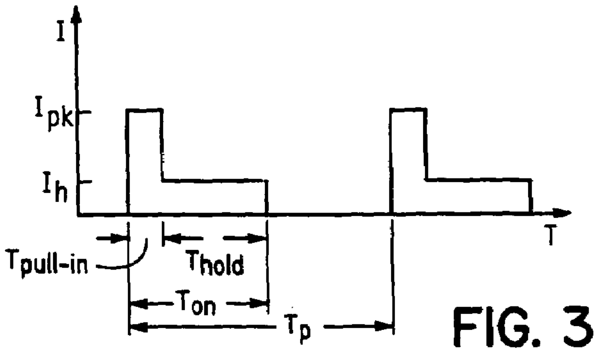
FIG. 3 is a schematic diagram of waveform signals used to provide a current to the electromagnetic coil of the liquid dispensing gun of FIG. 2.

Known electric liquid dispensing guns 10 typically apply a stepped waveform current to the coil 24 that has an initial spike and then steps down to a magnitude sufficient to hold the valve stem 32 in its open position by overcoming the opposing force of the return spring 56. One such current waveform is schematically illustrated in FIG. 3. To turn the gun on, thereby opening the dispensing orifice 46, an initial current magnitude $I_{pk}$ is applied for a duration or period of time $T_{pullin}$ in response to a trigger pulse. Thereafter, the current is reduced to a lesser hold level $I_h$ for $T_{hold}$, the remaining period of the on-time $T_{on}$. The zero current value is then maintained for an off-time $T_{off}$ during the remaining time of the waveform period $T_p$. The $T_{on}$ and $T_p$ are related to the adhesive pattern required for a particular product. The inductance and resistance of the electromagnetic coil 24 are a function of the gun itself, and $I_{pk}$ is normally bounded by the limits of magnetic saturation of the dispensing gun 12 or by thermal considerations.

The waveform period $T_p$ is inversely related to frequency. Thus, as the frequency of the trigger pulses increases, the period $T_p$ of the waveform decreases. Initial values of magnitudes of the peak and hold currents are based on the coil specifications, however, the peak current magnitude $I_{pk}$, the magnitude of the hold current $I_h$ and the duration of the peak current $T_{pull\text{-}in}$ are all adjustable by the user. Adjustment of the waveform current in order to tune the dispensing operation is necessary to ensure its peak performance. The present invention actively controls the waveform current allowing for adjustment over substantially the full range of operation of the dispensing gun 12, so that optimum gun performance is achieved and maintained.

Figure 4:
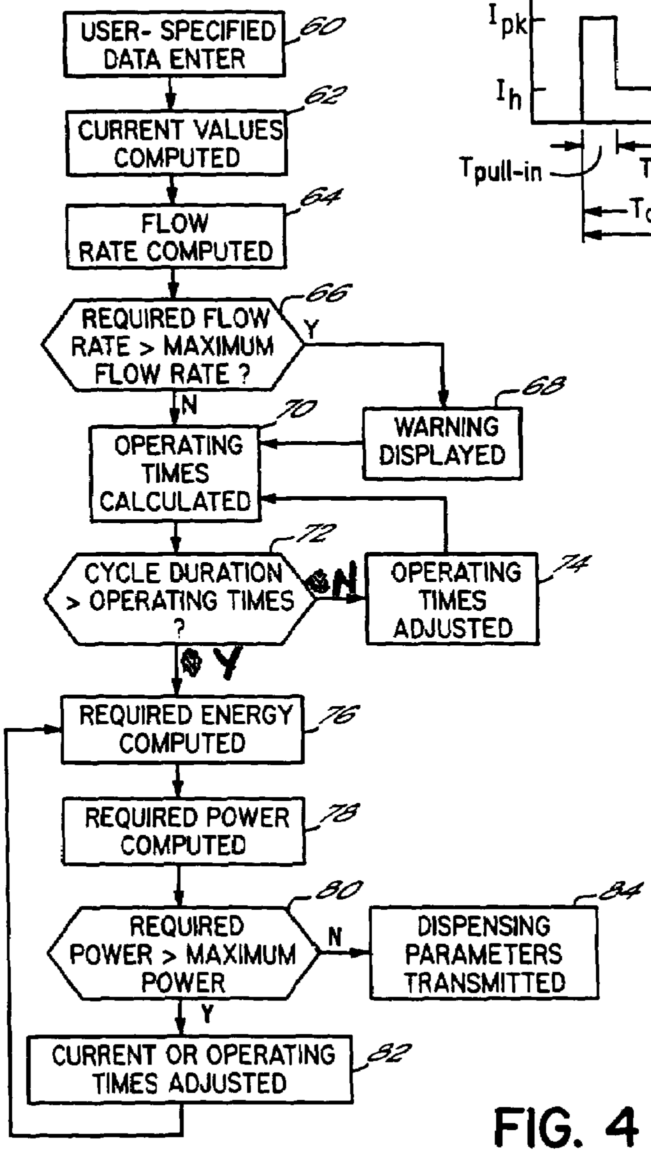
FIG. 4 is a flow chart illustrating process steps performed by a control circuit in order to determine the optimal dispensing parameters embodied in the waveforms of FIG. 3.

The waveform current of FIG. 3 embodies the dispensing parameters that are determined by software algorithm or look-up table of the control circuit 16. The flow chart of FIG. 4 depicts the process steps associated with the determination of those dispensing parameters. In particular, an operator inputs at block 60 user-specified data into the control circuit 16. The user-specified data includes the liquid viscosity, the operating temperature of the liquid dispensing system 10, the dispensing pattern and pattern definition data, the speed of the substrate and the gun configuration. Based upon the entered user-specified data, the control circuit 16 performs a calculation at block 62 to determine the $I_{pk}$ and $I_h$ values necessary for the particular liquid dispensing application conditions. At block 64, the necessary flow rate (measured in grams per minute) for the particular dispensing application is computed. The computed flow rate is a function of the viscosity of the fluid, the orifice size of the dispensing valve 40, the substrate speed and the desired dispensing pattern.

At block 66 a determination is made whether the required flow rate for the dispensing application exceeds the maximum flow rate capability of the gun 12. If the required flow rate is found to exceed the maximum flow rate of the gun 12, a warning is communicated to the operator at block 68 through a display at the control circuit 16. The warning informs the user that the flow rate necessary for the desired application is unattainable given the present configuration. However, since such a flow rate discrepancy will not damage the equipment, the process of determining dispensing parameters continues notwithstanding the warning. Next, the operating times that correspond to a dispensing cycle's open ($T_{on}$), hold ($T_h$) and closed ($T_{off}$) valve positions are determined at block 70 as a function of the peak current, viscosity and configuration of the electric dispensing guns 12.

At block 72 a determination is made whether the duration of a specified dispensing cycle ($T_{on}$) is greater than the sum of the determined operating periods ($T_{pull\text{-}in}$ and $T_{hold}$). If the sum of the $T_{pull\text{-}in}$ and $T_{hold}$ exceeds $T_{on}$ a warning is presented that informs and instructs the operator to adjust the user-specified data at block 74. The dispensing system 10 will not continue to determine dispensing parameters until the above period condition is satisfied. This feature prevents damage to the dispensing gun 12 that would otherwise result.

If the duration of the dispensing cycle is determined to be longer than the operating times, then the energy required for the operation of the coil 24 is computed at block 76 and the resultant energy calculation is then combined with the frequency with which the coil 24 is energized to compute at block 78 the input power required for the desired dispensing operation. The energy and power calculations are performed according to the following equations, although other equations and algorithms are possible without departing from the spirit and scope of the present invention:

$$R_{hot}=((T_{set}(1.8)+-41)*0.00218+1)*10.10$$

$$t_{rise}=\frac{i_{peak}}{7614.8}$$

$$E1=((919328393)*t_{rise}{}^{3})*R_{hot}$$

$$t_{pkhld}-\frac{t_{pullin}}{1000}-t_{rise}-.000145$$

$$E2=i_{peak}{}^{2}*(R_{hot})*t_{pkhlkd}$$

$$\alpha 0=(-0.9512)*i_{peak}+0.4199$$

$$\alpha 1=(-0.1709)*i_{peak}-0.0072$$

$$t_{decay}=e^{\frac{i_{hold-\alpha 0}}{\alpha 1}}$$

$$E3=(R_{hot})*(t_{decay})*\alpha 1^{2}*I_n(t_{decay})^{2}-2*\alpha 1^{2}*I_n(t_{decay})+2*\alpha 1^{2}*\alpha 1*\alpha 0*I_n(t_{decay})-2*$$

$$\alpha 1*\alpha 0+\alpha 0^{2}$$

$$t_{hold}=t_{no}-t_{pullin}-t_{decay}$$

$$E4=i_{hold}{}^{2}*(R_{hot})*(t_{hold})$$

$$t_{total}=t_{rise}+t_{pkhld}+t_{decay}+t_{hold}$$

$$E_{\backslash pattern}=E1+E2+E3+E4$$

$$E(Total)=\sum_{0}^{n}E_{\backslash pattern}$$

$$P(Total)=E(Total)*\omega$$

$$P(\max)=[-0.2331*T_{set}+50.891]*0.85$$

where:

$R_{hot}$=the resistance of the coil 24 at the setpoint temperature of the adhesive;

$t_{rise}$=time to reach peak current ($i_{peak}$);

$t_{pullin}$=time between the trigger pulse and when the peak current ($i_{peak}$) drops to hold current ($i_{hold}$);

$t_{pkhld}$=adjusted $t_{pullin}$;

$i_{peak}$=peak current;

$i_{hold}$=hold current;

$t_{decay}$=time for the coil current to drop from peak current ($i_{peak}$) to hold current ($i_{hold}$);

E(Total)=the sum of calculated energies for each individual $t_{\backslash pattern}$; and P(Total)=total power input to coil 24 at computed frequency ω.

At block 80, a determination is made whether the required input power to gun 12 exceeds the maximum power rating of the gun. If the maximum power rating is less than the required power calculated in block 78, then either the $I_{pk}$ or $T_{pull\text{-}in}$ values can be adjusted at block 82 depending upon the value of the calculated $I_{pk}$ current. Specifically, if the $I_{pk}$ value is less than 2.8 amperes, then the $T_{pull\text{-}in}$ value is reduced by 0.1 millisecond. Conversely, if the $I_{pk}$ value is greater than 2.8 amperes, then $I_{pk}$ is reduced by 0.05 amperes. Then the power is recalculated in block 76.

In either case, the operator is informed of the adjustment. Additionally, new operating times are computed at block 70 and are assigned in conformity with the modified current or period value. If the control circuit 16 determines that the required power is within the predetermined parameters of the maximum power, then at least the $I_{pk}$, $I_h$ and $T_{pullin}$ values are applied from the control circuit 16 to the programmable driver circuit 18 to set the dispensing parameters of the gun 12 at block 84. The programmable driver circuit 18 uses the determined dispensing parameters to generate the waveform current discussed in FIG. 3.

FIG. 5 illustrates one embodiment of programmable driver circuit 18 for use with liquid dispensing gun 12 in accordance with the principles of the present invention. Programmable driver circuit 18 receives digital signals, shown diagrammatically at 84, from the control circuit 16 and interface circuit 20 that set the digital potentiometers 22. Driver circuit 18 utilizes a low level digital logic signal, called a trigger pulse 86 to actuate a waveform signal 88. The waveform signal 88 is modulated according to signals 90 applied from the digital potentiometers 22. Waveform signal 88 is amplified by power converter 92 in order to generate a current signal 94 sufficient to energize the electromagnetic coil 24 of the dispensing gun 12. Additionally, the current signal 94 is continuously sampled to ensure that it reflects the generated waveform signal 88. Finally, information pertinent to the status of the dispensing operation is communicated back to the operator through a series of lights of the user indications 26 and/or a signal is generated to a relay control 96 coupled to an alarm device such as a programmable logic control (PLC), horn or remote warning light.

More specifically, a dispensing operation is initiated by a programmable driver circuit 18 when a trigger pulse 86 is actuated. The trigger pulse defines the point in time at which the current waveform is to be supplied to the coil 24, thereby opening the dispensing valve 40. The generation of the trigger pulse 86 is determined by a relative position of a detectable feature or portion of the substrate 14 with respect to the dispensing gun 12. The frequency of the trigger pulse 86 is synchronized with the speed of the assembly line to achieve a more efficient and coordinated dispensing operation. The trigger pulse 86 is generated by trigger actuator 98 and is input into waveform generator 100. In response to each trigger pulse, the waveform generator 100 provides waveform signal 88, which is modulated according to signals 90 applied from the digital potentiometers 22. The product of the waveform generator 100 is a specified waveform signal 88 similar to that illustrated in FIG. 3. As discussed above, the signals 90 from the digital potentiometers 22 have been set according to the digital signals 84 applied from the control circuit 16.

Specifically, the signals 90 from the digital potentiometers 22 are used to determine the $I_{pk}$, $I_h$ and $T_{pull\text{-}in}$ of the generated waveform signal 88. Should a dispensing operation call for dot mode operation, then the duration of a specified dot application is additionally applied to the waveform generator 100 from the digital potentiometers 22. This additional cycle duration parameter is required to stop the transmission of current to the dispensing gun 12 before the end of the trigger pulse 86. When alternatively in continuous bead operation, the termination of current coincides with the end of the continuous bead cycle, so no similar cycle duration parameter is necessary.

The generated waveform signal 88 is transmitted to a first input of an operational amplifier 102. The differential voltage between the generated waveform signal 88 and the summation of both the feedback current 104 and the coil output voltage 106 is amplified. The above summation is formed at a summing junction 108 located at the second input of the operational amplifier 102. The operational amplifier 102 generates an analog signal 110 that is transmitted to an output controller 112. The analog signal 110 is amplified according to a gain adjustment signal 114 applied by the digital potentiometers 22. The gain adjustment signal 114 reflects a manufacturing setting or calibration.

Additionally, the analog signal 110 may be terminated at the output controller 117 by a disabling signal 116. Output diagnostic circuit 118 applies the disabling signal 116 in response to the detection of an open voltage condition. An open voltage condition occurs when the programmable driver circuit 118 becomes isolated from the dispensing unit due to some mechanical failure or disconnect, such as an interruption of power to the dispensing gun 12. Such an occurrence can cause serious damage to driver 18 if not detected and corrected. The open voltage status is determined as a function of the measured voltage across the dispensing gun 12.

Ultimately, an analog waveform signal 120 is applied from the output controller 112 to a summing junction 122. The generated waveform signal 120 is added to the feedback current 104 at the summing junction 122. The resultant signal 124 is then passed on to power converter 92. At power converter 92, the relatively low-level resultant signal 124 is stepped-up to a high-powered signal that is necessary to operate the dispensing gun 12. The power converter 92 utilizes an alternating current power source 126 to filter, rectify and modulate an alternating current signal so as to be in conformity with the parameters communicated by the resultant signal 124.

The waveform current 94 from the power converter 92 is then applied to the electromagnetic coil 24 of the dispensing gun 12. The waveform current signal 94 induces a magnetic field in the electromagnetic coil 24 that draws the armature 50 towards the coil 24 and away from the valve seat outlet 42 with a force sufficient to overcome the force of the spring 56. The movement of the armature 50 away from the valve seat outlet 42 allows fluid to escape through the dispensing orifice 46. Conversely, when no current is transmitted from the power converter 92 to the coil 24, the magnetic field induced by the electromagnetic coil 24 is dissipated and can no longer overcome the force of the spring 56. Subsequently, the spring 56 biases the armature 50 towards the valve seat 38 such that the flow of fluid is blocked through the dispensing orifice 46.

Current from the power converter 92 to the dispensing gun 12 continues through the electromagnetic coil 24 to a current sensor 128. The feedback current 104 is directed from the current sensor 128, which may be a simple resister or Hall Effect device. The feedback current 104 is continually channeled into various devices throughout the programmable driver circuit 18 to ensure that the current power settings provided to the dispensing gun 12 accurately reflect the parameters from the generated waveform signal 120. Namely, the feedback current 104 is fed into the output diagnostic circuit 118 and a thermal diagnostic circuit 130, as well as into the summing junctions 108 and 122.

The purpose of both circuits 118 and 130 is to communicate information pertinent to the operation of the dispensing gun 12 to the operator of the dispensing equipment. Output diagnostic circuit 118 provides information that concerns the current supplied to the dispensing gun 12. Thermal diagnostic circuit 130 provides diagnostic information that reflects the operating temperatures of the coil 24. Specifically, output diagnostic circuit 118 evaluates the feedback current 104 in conjunction with a signal 132 from a voltage detector 134 to determine if an open or short circuit has occurred.

Should such a condition be detected, a signal 136 from output diagnostic circuit 118 illuminates light emitting diodes of user indications 26 to communicate the conditions to the operator. In the specific instance of an open circuit occurrence, the disabling signal 116 is sent to the output controller 112. Output diagnostic circuit 118 additionally applies to the operator a visual indication of whether the trigger pulse is active, as well as whether fluid is actively being dispensed.

Similarly, the feedback current 104 is evaluated by the thermal diagnostic circuit 130 in conjunction with a thermal fault level signal 138 applied from the digital potentiometers 22. Thermal fault level signal 138 reflects the threshold operating temperature at which the coil 24 and dispensing valve 40 can be damaged. The thermal fault level will vary according to the different characteristics of the liquid dispensing gun 12. The thermal diagnostic circuit applies signals 140 to illuminate light emitting diodes of the user indicators 26 to indicate the dispensing gun 12 operating temperatures. For instance, a green light indicates normal acceptable operating temperatures, while a yellow and red light indicate higher than normal and unacceptable thermal fault temperatures, respectively. Additionally, should an open circuit, short circuit, or a thermal fault be indicated, a remote audible or visual alarm device will be activated through relay control 96, further ensuring that the operator is cognizant of any potentially detrimental operation. Details of one exemplary thermal management system for use in the present invention are described in detail in co-pending U.S. Ser. No. 09/533,347, entitled ELECTRICALLY OPERATED VISCOUS FLUID DISPENSING APPARATUS AND METHOD, owned by the common assignee, the disclosure of which is hereby incorporated by reference herein in its entirety.

Figure 6:
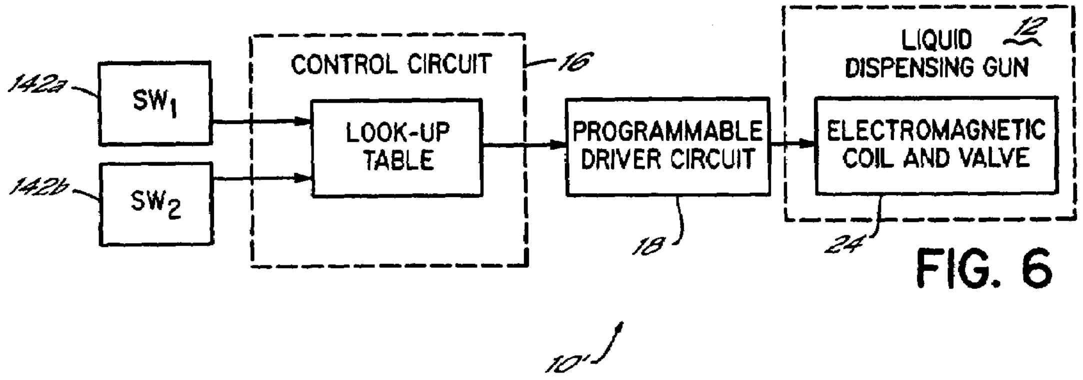
FIG. 6 is a functional block diagram illustrating an alternative embodiment of a liquid dispensing gun system in accordance with the principles of the present invention.

FIG. 6 illustrates an alternative embodiment of a liquid dispensing system 10' in accordance with the principles of the present invention. According to this aspect of the present invention, an operator inputs user-selected data by adjusting one or more selector devices 142*a* and 142*b*, such as an encode rotary switch or electronic keypad. For instance, the viscosity of the fluid to be dispensed may be input by adjusting selector device 142*a*. The second selector device 142*b* may likewise be adjusted to designate the type and model of the dispensing gun 12 employed in the dispensing application. It should be evident that a single selector device could alternatively be used to control both the viscosity and gun model settings. Also, if the driver circuit 18 employed in the dispensing application is only operable to control a single type of dispensing gun 12, then no second selector device 142*b* need be included.

In practice, an operator provides a setting via selector device 142*a* that corresponds to the viscosity of the applied fluid and a setting via selector device 142*b* that corresponds to the gun type. The settings through selector devices 142*a* and 142*b* are applied to the control circuit 16 as digital signals, such as binary encoded signals. The control circuit 16 executes a look-up table to associate the user-selected data with optimal dispensing parameters of the gun 12 for the particular dispensing application. Namely, the user-selected data that relates to fluid viscosity is used to generate the $I_{pk}$ and $T_{pullin}$ parameters. Likewise, the user selected data that relates to the model of the dispensing gun 12 is used to generate the hold current ($I_h$) value. In this embodiment, the control circuit 16 may be mounted on or attached to the programmable driver circuit 18.

The control circuit 16 generates digital signals that correspond to the optimum dispensing parameters for the indicated dispensing application. These digital signals are applied to the digitally-controlled potentiometers 22 of the programmable driver circuit 18. The potentiometers 22 vary the voltage supplied to the electromagnetic coil 24 of the liquid dispensing gun 12 such that its operation corresponds to the associated dispensing parameters. As with the above embodiment, diagnostic information pertinent to the operation of the liquid dispensing gun 12, such as equipment operating temperature, is indicated by a series of illuminated light emitting diodes on the use indications 26.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

Having described the invention, we claim:

1. A liquid dispensing system operable by a user for dispensing a liquid onto a substrate, comprising:

at least one solenoid actuated, non-pneumatic, liquid dispensing gun having an electromagnetic coil, a dispensing orifice and a dispensing valve stem movable relative to said dispensing orifice, said coil being operable by a current waveform comprising a higher magnitude initial peak current followed by a lower magnitude hold current;

an input device operable by a user to enter application data representing operating conditions of a liquid dispensing application;

a control circuit connected to said input device and operable to receive said application data representing operating conditions of a liquid dispensing application, said control circuit having one of a software algorithm and a look-up table configured to process said application data and generate digital signals that define desired peak and hold current values corresponding to said application data; and a digitally programmable driver circuit connected between said control circuit and said electromagnetic coil, said digitally programmable driver circuit comprising a non-volatile memory for storing said desired peak and hold current values, said digitally programmable driver circuit operable to generate a desired current waveform in response to said desired peak and hold current values and apply said desired current waveform to said electromagnetic coil for moving said dispensing valve stem toward and away from said dispensing orifice.

2. The liquid dispensing system of claim 1 wherein said application data comprising at least one of a liquid viscosity, a liquid temperature, a dispensing pattern and pattern definition data, a line speed, an identification of a dispensing gun used, or a combination thereof.

3. The liquid dispensing system of claim 1 wherein said input device comprises a graphical user interface and said control circuit is operable to prompt a user to enter said application data.

4. The liquid dispensing system of claim 1 wherein said digitally programmable driver circuit comprises an input for receiving a pulse commanding the digitally programmable driver circuit to supply the desired current waveform to the electromagnetic coil independent of the control circuit.

5. The liquid dispensing system of claim 1 wherein said control circuit is detachable from said digitally programmable driver circuit and said digitally programmable driver circuit continues to be operable to generate said desired current waveform.

6. The liquid dispensing system of claim 1 wherein said digitally programmable driver circuit comprises at least one digital potentiometer.

7. The liquid dispensing system of claim 1 wherein said digitally programmable driver circuit comprises at least one digital-to-analog converter.

8. The liquid dispensing system of claim 1 further comprising:

a first electrically operated, non-pneumatic, liquid dispensing gun comprising a first electromagnetic coil, a first dispensing orifice and a first dispensing valve stem movable relative to said first dispensing orifice; and a second electrically operated, non-pneumatic, liquid dispensing gun comprising a second electromagnetic coil, a second dispensing orifice and a second valve stem movable relative to said second dispensing orifice, said second electromagnetic coil being connected in a series circuit with said first electromagnetic coil and said series circuit being connected to said digitally programmable driver circuit.

9. The liquid dispensing system of claim 1 wherein said input device comprises a first input device operable by a user to select first data identifying one of a plurality of models of dispensing guns and said control circuit operable to generate said digital signals that define desired peak and hold current values in response to said first data.

10. The liquid dispensing system of claim 1 wherein said input device comprises a second input device operable by a user to select second data identifying one of a plurality of viscosities of the liquid, said control circuit operable to generate said digital signals defining desired peak and hold current values in response to said second data.

11. The liquid dispensing system of claim 1 wherein said input device comprises:

a first input device operable by a user to select first data identifying one of a plurality of models of dispensing guns; and a second input device operable by a user to select second data identifying one of a plurality of viscosities of the liquid, said control circuit operable to generate said digital signals defining desired peak and hold current values in response to both said first data and said second data.

12. A method of dispensing liquid from a liquid dispensing system having at least one solenoid-actuated, non-pneumatic, liquid dispensing gun including an electromagnetic coil, a dispensing orifice, a dispensing valve stem movable relative to the dispensing orifice, the electromagnetic coil being operable by a current waveform comprising a higher magnitude initial peak current followed by a lower magnitude hold current, the method comprising:

entering application data representing operating conditions of a liquid dispensing application;

generating with a control circuit digital signals defining desired peak and hold current values of a desired current waveform in response to the application data;

storing the digital signals in a non-volatile memory in a digitally programmable driver circuit connected between the control circuit and the electromagnetic coil;

producing the desired current waveform in response to the desired peak and hold current values stored in the digitally programmable driver circuit; and energizing the electromagnetic coil with the desired current waveform to move the dispensing valve stem toward and away from the dispensing orifice to dispense liquid from the liquid dispensing gun.

13. The method of claim 12 wherein entering application data further comprises entering application data comprising at least one of a liquid viscosity, a liquid temperature, a dispensing pattern and pattern definition data, a line speed, an identification of a dispensing gun used, or a combination thereof.

14. The method of claim 12 wherein prior to entering application data, the method comprises prompting a user to enter said application data by operation of the control circuit.

15. The method of claim 12 wherein prior to producing the desired current waveform, the method comprises receiving independent of the control circuit a signal commanding the digitally programmable driver circuit to produce the desired waveform.

16. The method of claim 12 wherein after storing the digital signals in the non-volatile memory, the method further comprises detaching and removing the control circuit from the digitally programmable driver circuit and the digitally programmable driver circuit continuing to be operable to generate the desired current waveform.

17. The method of claim 12 wherein entering application data comprises selecting first data identifying one of a plurality of models of dispensing guns and said control circuit operable to generate said digital signals that define desired peak and hold current values in response to said first data.

18. The method of claim 12 wherein entering application data comprises selecting second data identifying one of a plurality of viscosities of the liquid, said control circuit operable to generate said digital signals defining desired peak and hold current values in response to said second data.

19. The method of claim 12 wherein entering application data comprises:

selecting first data identifying one of a plurality of models of dispensing guns; and selecting second data identifying one of a plurality of viscosities of the liquid, said control circuit operable to generate said digital signals defining desired peak and hold current values in response to both said first data and said second data.

* * * * *